United States Patent
Jiang et al.

(10) Patent No.: US 9,860,367 B1
(45) Date of Patent: Jan. 2, 2018

(54) DIAL PATTERN RECOGNITION ON MOBILE ELECTRONIC DEVICES

(71) Applicant: International Business Machines Corporation, Armonk, NY (US)

(72) Inventors: Tao Jiang, Shanghai (CN); Ping Li, Shanghai (CN); Yong C. Li, Shanghai (CN); Xian D. Meng, Shanghai (CN); Zhao L. Wang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/277,236

(22) Filed: Sep. 27, 2016

(51) Int. Cl.
*H04M 1/00* (2006.01)
*H04M 1/725* (2006.01)
*H04M 3/51* (2006.01)

(52) U.S. Cl.
CPC ......... *H04M 1/72583* (2013.01); *H04M 3/51* (2013.01); *H04M 2250/60* (2013.01)

(58) Field of Classification Search
CPC ............. H04M 1/271; H04M 1/72583; H04M 1/72522; H04M 3/51; H04M 3/56; H04M 3/563; H04M 15/715; H04M 15/705; H04M 15/887; G06F 3/048; G10L 15/26; H04W 4/001; H04W 4/24
See application file for complete search history.

(56) References Cited

U.S. PATENT DOCUMENTS

| | | | |
|---|---|---|---|
| 8,565,398 B2 | 10/2013 | Hillier et al. | |
| 8,831,582 B1* | 9/2014 | Haid | H04M 3/56 370/260 |
| 9,288,643 B2 | 3/2016 | Wang et al. | |
| 2004/0018857 A1 | 1/2004 | Asokan et al. | |
| 2004/0230435 A1* | 11/2004 | Douros | H04M 1/271 704/275 |
| 2006/0141990 A1 | 6/2006 | Zak et al. | |
| 2007/0161369 A1 | 7/2007 | Vishwanathan et al. | |
| 2007/0208561 A1* | 9/2007 | Choi | G10L 15/26 704/231 |
| 2008/0227440 A1* | 9/2008 | Settepalli | H04M 1/72522 455/418 |
| 2015/0058006 A1* | 2/2015 | Proux | G10L 15/26 704/235 |

FOREIGN PATENT DOCUMENTS

| | | |
|---|---|---|
| EP | 1204018 A2 | 8/2002 |
| EP | 1525737 A2 | 4/2005 |

OTHER PUBLICATIONS

C-Zentrix Dialer, http://c-zentrix.com/features/dialert, retrieved from internet May 30, 2016, 3 pages.
Call Saver App, http://www.inote.tw/call-saver, retrieved from internet Sep. 27, 2016, 8 pages.

* cited by examiner

*Primary Examiner* — Thanh Le
(74) *Attorney, Agent, or Firm* — Reza Sarbakhsh; SVL IPLaw Edell, Shapiro & Finnan, LLC

(57) ABSTRACT

Recognizing and utilizing dial patterns of a mobile electronic device includes detecting an input sequence, recording the input sequence when the input sequence is detected, and determining whether the input sequence is a reoccurring pattern. If the input sequence is a reoccurring pattern, the input sequence is stored in a repository as a dial pattern that is assigned to a call number. When a call number is detected in a dialer, the dial pattern is then presented to the dialer, and the dial pattern is dialed upon establishing a connection with the call number.

21 Claims, 9 Drawing Sheets

DIAL PATTERN RECOGNITION ON MOBILE ELECTRONIC DEVICES

BACKGROUND

1. Technical Field

Present invention embodiments relate to dial patterns of mobile electronic devices, and more specifically, the recognition of dial patterns input on mobile electronic devices and presenting the dial patterns to automatically navigate through automated menu messages of a call center.

2. Discussion of the Related Art

Call centers often use automated menu messages that require inbound callers to navigate through these automated menu messages. These automated menu messages may be used by a variety of call centers (e.g., banks, hotels, airlines, utility companies, service providers, customer support centers, etc.) for numerous different reasons (e.g., billing inquiries, paying bills, booking travel itineraries, logging complaints, etc.). Callers are often annoyed when required to navigate through these automated menu messages. In addition, callers are often required to repeatedly navigate through these automated messaged, which is time consuming.

Dial patterns may be used by mobile electronic devices, but fail to provide dial strings that focus on the service and interaction after connecting to call centers. For example, these dial patterns fail to navigate a user through automated menus presented by call centers. These dial patterns are focused on the connection setup phase of dialing, not the service and interaction phase after the connection is established with the call center.

In addition, while some programs for mobile electronic devices do present dial patterns that can be used to reach the manual service or operator of a call center, these dial patterns are static. The dial patterns of these programs are fixed, not editable, and are the same for each person regardless of their personal information.

SUMMARY

According to one embodiment of the present invention, recognizing and utilizing dial patterns of a mobile electronic device includes detecting an input sequence provided to the mobile device after placing a call for requesting an activity from among a menu of activities. Furthermore, the input sequence is stored in a repository as a dial pattern assigned to a call number in response to the input sequence being a reoccurring pattern. Finally, in response to detection of the call number in a dialer of the mobile electronic device, the assigned dial pattern is retrieved and dialed to request the activity upon establishing a connection based on the call number. Embodiments of the present invention further include a method and computer program product for recognizing and utilizing dial patterns of a mobile electronic device in substantially the same manner described above.

Present invention embodiments automatically determine dial patterns based on human behavior with a standard dialer on a mobile electronic device, and then saves the detected dial patterns for future use when establishing connections with call centers. The present invention embodiments provide dial patterns that enable efficient navigation of automated menus presented by call centers.

Present invention embodiments may further include various other aspects. For example, a present invention embodiment may store the dial patterns in a repository that is disposed locally within the mobile electronic device. In addition, the dial pattern may include a dial string that is comprised of a series of numbers and pauses. The series of numbers and pauses may be used by the dialer to navigate an automated menu message of a call center.

Moreover, present invention embodiments may include at least one protected field of numbers within the dial pattern that is encrypted. If the dial pattern includes at least one protected field of numbers, the at least one protected field of numbers is stored in a secure repository. Thus, the protected fields of the dial pattern are more securely stored than the dial string of the dial pattern.

BRIEF DESCRIPTION OF THE DRAWINGS

Generally, like reference numerals in the various figures are utilized to designate like components.

DETAILED DESCRIPTION

Presented herein are techniques for recognizing dial patterns associated with navigating automated menu messages of call centers and presenting recognized dial patterns for use by a user. Generally, the techniques provided herein recognize dial patterns input by users on a standard dialing interface of a mobile electronic device. Once a dial pattern has been recognized, the dial patterns may be saved for future use for specific call numbers. In at least some of the present invention embodiments, the dial patterns may be saved locally on the mobile electronic device, while in other embodiments of the present invention, the dial patterns may be saved to a cloud computing system. When a call number with associated dial patterns is input into a dialer, an improved user interface of the dialer presents the dial patterns associated with that call number. The user of the mobile electronic device may then select which dialer pattern, if any, to use for navigating through the automated menus of the call center.

These techniques create a more efficient and less time consuming manner of navigating through automated menus of a call center. Moreover, the techniques provided herein automatically detect dial patterns that are frequently used by a user and then save the detected dial patterns for future use when calling call centers. The techniques provided herein automatically present the saved dial patterns for selection by a user when calling a call center.

Figure 1:
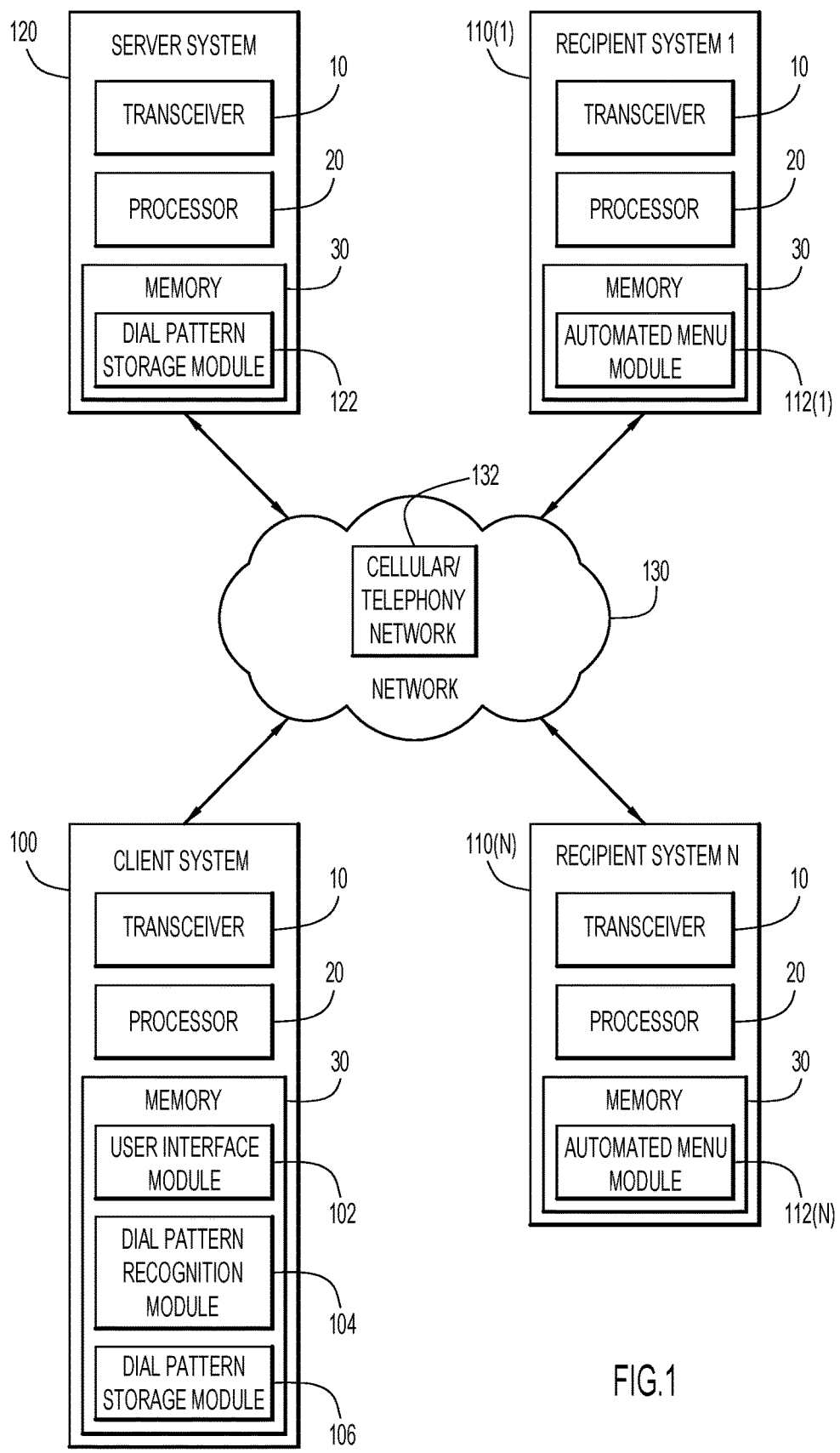
FIG. 1 illustrates an example environment in which the present general inventive concept can be embodied.

An example environment for use with present invention embodiments is illustrated in FIG. 1. Specifically, the environment includes one or more client or end-user systems 100, one or more recipient systems 110 (including a first recipient system 110(1) and recipient system N 110(N)). In addition, the environment may include one or more server systems 120. Client system 100, recipient systems 110(1)-110(N), and server system 120 may be remote from each other and communicate over a network 130. The network may be implemented by any number of any suitable communications media (e.g., wide area network (WAN), local area network (LAN), Internet, Intranet, etc.). In one example embodiment, network 130 may include cellular/telephony network 132 to enable cellular or telephone communications between client system 100, recipient systems 110(1)-110(N), and server system 120. Alternatively, client system 100, recipient systems 110(1)-110(N), and server system 120 may be local to each other, and communicate via any appropriate local communication medium (e.g., local area network (LAN), hardwire, wireless link, Intranet, etc.).

Client system 100 may be implemented by any conventional or other computer systems or by any mobile electronic device. Client system 100 is preferably equipped with a display or monitor, a base (e.g., including at least one processor 20, one or more memories 30 and/or internal or external transceiver devices 10 (e.g., cellular or telephony transceiver, modem, network cards, etc.)), optional input devices (e.g., touch screen display, a keyboard, mouse, or other input device), and any commercially available and custom software (e.g., server/communications software, telecommunications software, user interface module, dial pattern recognition module, dial pattern storage module, standard dialer module, etc.). Recipient systems 110(1)-110(N) and server system 120 may be implemented by any conventional or other computer systems preferably equipped with a display or monitor, a base (e.g., including at least one processor 20, one or more memories 30 and/or internal or external transceiver devices 10 (e.g., cellular or telephony transceiver, modem, network cards, etc.)), optional input devices (e.g., a keyboard, mouse or other input device), and any commercially available and custom software (e.g., server/communications software, dial pattern storage module, automated menu module, etc.).

Client system 100 may enable users to establish communication links via communication channels (e.g., email, SMS/text messaging, tweeting, instant messaging, audio calls, video chats, etc.) with the recipient systems 110(1)-110(N) and/or the server system 120. In one example embodiment, the client system may be a mobile electronic device. The client system 100 may include user interface module 102 that presents a dialing interface to the users of the client system 100, a dial pattern recognition module 104 that is capable of recognizing dial patterns entered by the user through the user interface module 102, and dial pattern storage module 106 that is configured to store the dial patterns recognized by the dial pattern recognition module 104. The recipient devices 110(1)-110(N) may include automated menu modules 112(1)-112(N) that present automated menus to inbound callers. The automated menus may be navigated by users of the client system 100 when a communication session is established between the client device 100 and at least one of the recipient devices 110(1)-110(N). The server system 120 may also include a dial pattern storage module 122 that may collect and store dial patterns recognized by the dial pattern recognition module 104 of the client system 100.

Modules 102, 104, 106, 112(1)-112(N), 122 may include one or more modules or units to perform the various functions of present invention embodiments described below. The various modules (e.g., user interface module, dial pattern recognition module, dial pattern storage modules, and automated menu modules, etc.) may be implemented by any combination of any quantity of software and/or hardware modules or units, and may reside within memory 30 of the client system 100, recipient systems 110(1)-110(N), and/or server system 120 for execution by processor 20.

In the environment illustrated in FIG. 1, the user interface module 102 of the client system 100 may present either a new dialer interface for the client system 100 or may modify an existing dialer interface already present on the client system 100. The user interface module 102 may allow a user to dial a number to establish a connection with at least one of the recipient systems 110(1)-110(N) (e.g., through a touch tone dial pad of the user interface module 102). Furthermore, the user interface module 102 may present saved dial patterns to the user of the client system 100 when the user dials the contact number of at least one of the recipient devices 110(1)-110(N). The user interface module 102 may also enable a user of the client system 100 to choose one of the presented dial patterns to be used for navigating the automated menus of the recipient systems 110(1)-110(N).

In addition, the dial pattern recognition module 104 works in conjunction with the user interface module 102 to detect dial patterns that are entered into the dialer of the user interface module 102. The dial pattern recognition module 104 may detect when a user is inputting a sequence or entry into the dialer of the user interface module 102, and may also determine whether or not the detected input sequence or entry is a dial pattern. The dial pattern recognition module 104 may determine that a detected input sequence or entry is a dial pattern when the input sequence or entry has reoccurred a predetermined amount of times within a period of time. Upon the determination that an entered sequence or entry is a dial pattern, the dial pattern recognition module 104 may assign the dial pattern to a specific user of the client system 100, an identifier, and may associate the dial pattern with a specific call number. The dial pattern recognition module 104 may also save any recognized dial patterns within a repository via the dial pattern storage modules 106, 122.

The dial pattern storage modules 106, 122 enable the storage of recognized dial patterns within a repository or other storage device. The dial pattern storage module 106 enables storage of a recognized dial pattern locally to the client system 100. The dial pattern storage module 122 enables storage of a recognized dial pattern remotely on the server system 120. Both dial pattern storage modules 106, 122 may encrypt the stored dial patterns when the dial patterns contain sensitive or confidential information (e.g., credentials, credit card numbers, social security numbers, bank account numbers, etc.).

Finally, the automated menu modules 112(1)-112(N) of the recipient systems 110(1)-110(N) enable a communication session to be established between at least one of the recipient systems 110(1)-110(N) and the client system 100. Once a communication session has been established, the automated menu modules 112(1)-112(N) present automated menus to the user of the client system 100. The automated menu modules 112(1)-112(N) enable a user of the client system 100 to navigate the automated menus via the use of entries entered on the client system 100 through the standard dialer of the user interface module 102. The automated menu modules 112(1)-112(N) may utilize interactive voice response (IVR) technology to allow a computer to interact with humans through the use of voice and tones input via keypad. Users of client systems 100 may be able to interact with the recipient systems 112(1)-112(N) by navigating through automated menus presented by the automated menu message module 112(1), where the users use the dial pad of the user interface module 102 to follow the dialogue of the automated menu presented by the automated menu message module 112(1). The automated menu message module 112 (1) can respond with prerecorded or dynamically generated audio to further direct users on how to proceed. In other words, the automated menu modules 112(1)-112(N) allows users to request an activity from among a menu of activities.

Figure 2:
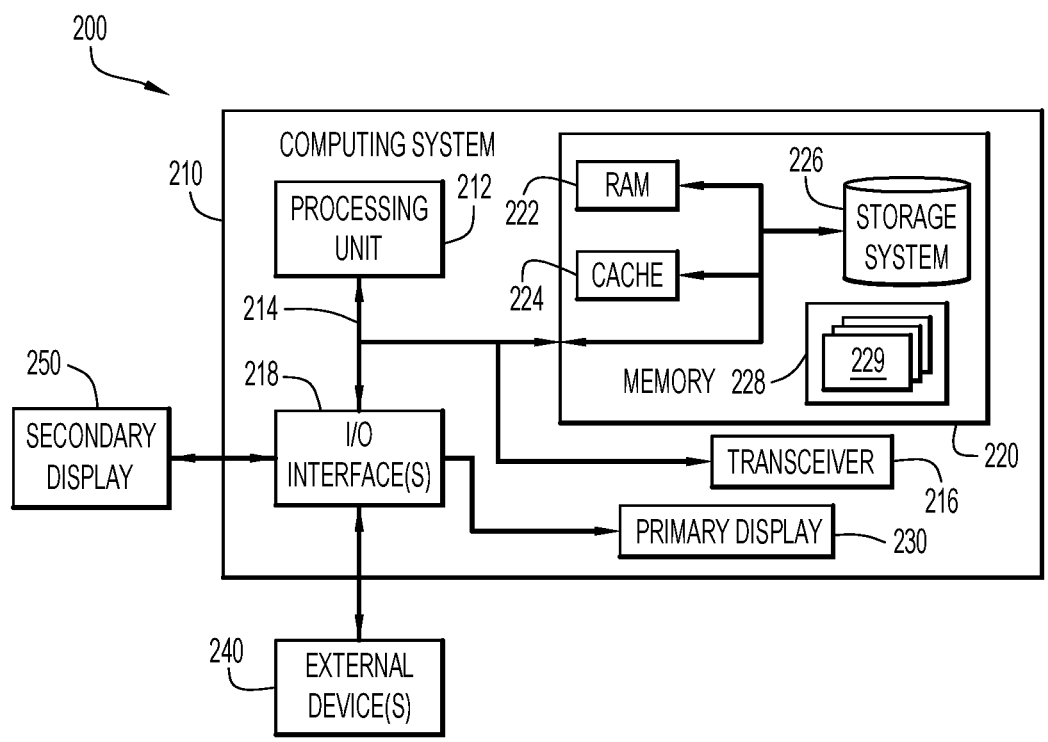
FIG. 2 is a block diagram of the client system according to an embodiment of the present invention.

Referring now to FIG. 2, a schematic of an example of a mobile electronic device 200 is shown, where the mobile electronic device 200 serves as an example embodiment of the client system 100 in environment illustrated in FIG. 1. The mobile electronic device 200 is only one example of a suitable client system 100 and is not intended to suggest any limitation as to the scope of use or functionality of embodiments of the invention described herein. Regardless, mobile electronic device 200 is capable of being implemented and/or performing any of the functionality set forth herein.

In mobile electronic device 200, there is a computing system 210 which is operational with numerous other general purpose or special purpose computing system environments or configurations. While computing system 210 is incorporated and operational within mobile electronic device 200, computing system 210 may also be suitable for use with, but not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computing system 210 may be described in the general context of computer system executable instructions, such as program modules, being executed by a computer system. Generally, program modules may include routines, programs, objects, components, logic, data structures, and so on that perform particular tasks or implement particular abstract data types.

In FIG. 4, computing system 210 is shown in the form of a general-purpose computing device. The components of computing system 210 may include, but are not limited to, one or more processors or processing units 212, a system memory 220, and a bus 214 that couples various system components including system memory 220 to processor 212.

Bus 214 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 210 typically includes a variety of computer system readable media. Such media may be any available media that is accessible by computing system 210, and it includes both volatile and non-volatile media, removable and non-removable media.

System memory 220 can include computer system readable media in the form of volatile memory, such as random access memory (RAM) 222 and/or cache memory 224. Computing system 210 may further include other removable/non-removable, volatile/non-volatile computer system storage media. System memory 220 may further include storage system 226, which may be a database or repository for storing dial patterns and protective fields as further detailed below. In such instances, each can be connected to bus 214 by one or more data media interfaces. As will be further depicted and described below, memory 220 may include at least one program product having a set (e.g., at least one) of program modules that are configured to carry out the functions of embodiments of the invention.

Program/utility 228, having a set (at least one) of program modules 229, may be stored in memory 220 by way of example, and not limitation, as well as an operating system, one or more application programs, other program modules, and program data. Each of the operating system, one or more application programs, other program modules, and program data or some combination thereof, may include an implementation of a networking environment. Program modules 229 (e.g., including user interface module 102, dial pattern recognition module 104, and dial pattern storage module 106) generally carry out the functions and/or methodologies of embodiments of the invention as described herein.

Computing system 210 may also include an Input/Output (I/O) interface 218 that is connected to a primary display 230 and further configured to enable the computing system 210 to communicate with one or more external devices 240 such as a keyboard, a pointing device, a secondary display 230, etc. The primary display 230 may be a touch screen display, and may serve as the primary I/O source of the computing system 210. The external devices 240 may be one or more devices that enable a user to interact with computing system 210; and/or any devices (e.g., network card, modem, etc.) that enable computing system 210 to communicate with one or more other computing devices. Still yet, computing system 210 can communicate with one or more networks such as a local area network (LAN), a general wide area network (WAN), and/or a public network (e.g., the Internet) via network adapter 216. As depicted, network adapter 216 communicates with the other components of computing system 210 via bus 214. It should be understood that although not shown, other hardware and/or software components could be used in conjunction with computing system 210. Examples, include, but are not limited to: microcode, device drivers, redundant processing units, external disk drive arrays, RAID systems, tape drives, and data archival storage systems, etc.

Figure 3:
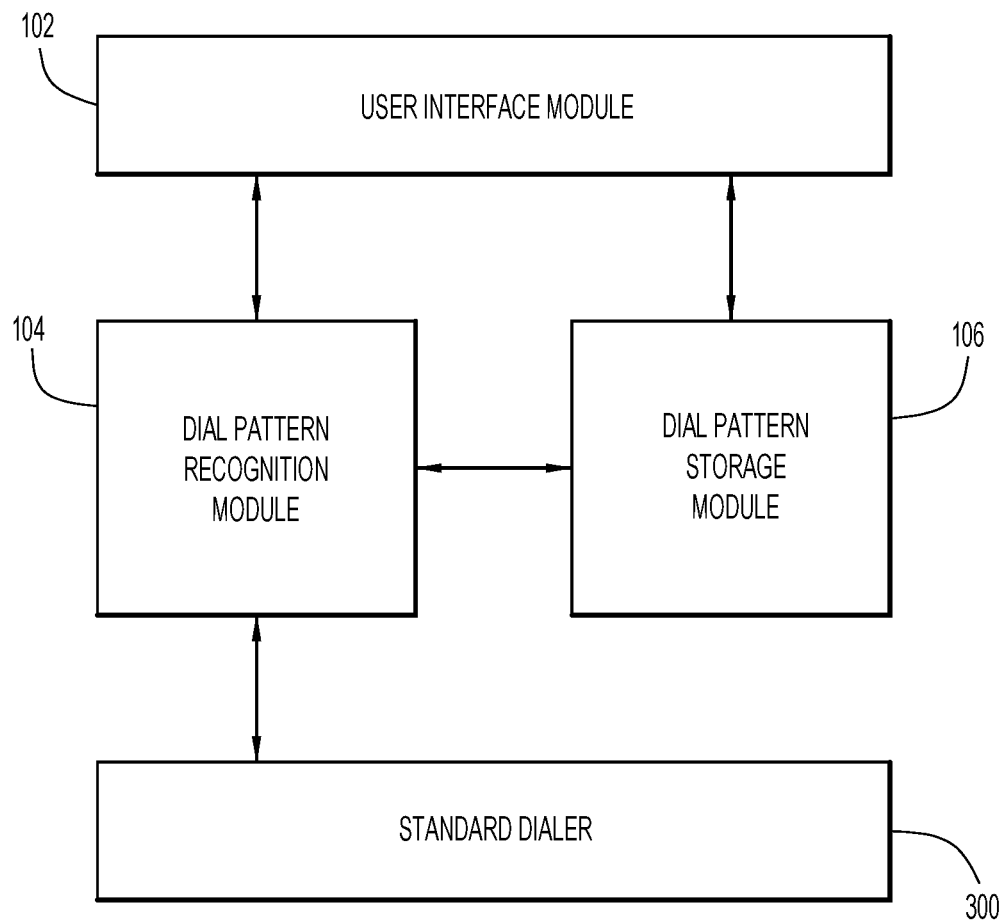
FIG. 3 is a schematic diagram illustrating the interaction of the various modules of the client system according to an embodiment of the present invention.

With reference now to FIG. 3, a schematic illustrating the interaction between various modules of the client system 100 is shown. As previously explained, the user interface module 102, dial pattern recognition module 104, and dial pattern storage module 106 may be disposed on the memory 30 of the client system 100. The client system 100 may further include a standard dialer 300, which enables the client system 100 to dial phone numbers. The standard dialer 300 may present to the primary display 230 a keypad having at least digits zero through nine, a pound key, and a star key. A user of the client system 100 may use the standard dialer 300 to both enter/dial phone numbers in order to establish a connection with a recipient (e.g., the recipient systems 110(1)-110(N)), and to navigate automated menus output by the recipient systems 110(1)-110(N).

As illustrated in FIG. 3, the dial pattern recognition module 104 is configured to communicate with the standard dialer 300 of the client system 100. More specifically, the dial pattern recognition module 104 may be configured to monitor the entries input to the client system 100 through the standard dialer 300. The dial pattern recognition module 104, in monitoring the standard dialer 300, may be configured to also monitor the time period between entries (e.g., short pauses, long pauses, etc.). In addition, the dial pattern recognition module 104 may also be configured to listen to the audio received by the dialer upon connection of the client system 100 with one of the recipient systems 110(1)-110(N) to monitor and record when keypad entries are entered in relation to the received audio. In other words, the dial pattern recognition module 104 may monitor what entries of the dialer 300 are entered in response to prompts from an automated menu message. Furthermore, the dial pattern recognition module 104 may be configured to recognize whether or not the sequence of entries input through the dialer 300 is a reoccurring pattern.

As further illustrated in FIG. 3, the dial pattern recognition module 104 is also in connection with the dial pattern storage module 106. Whenever the dial pattern recognition module 104 determines that a sequence of entries input through the standard dialer 300 is a reoccurring pattern, the dial pattern recognition module 104 communicates with the dial pattern storage module 106 to store the reoccurring pattern in a repository (e.g., storage system 226).

The dial pattern recognition module 104 is also in communication with the user interface module 102, as illustrated in FIG. 3. Thus, the dial pattern recognition module 104 may be configured to present dial patterns selected by a user through the user interface module 102 to the dialer 300 so that the selected dial patterns may be automatically entered through the standard dialer 300. The user interface module 102 is also in connection with the dial pattern storage module 106. Thus, the user interface module 102 is also able to access and present dial patterns to a user when detecting a call to a specific recipient system 110(1)-110(N). Once a specific dial pattern is chosen through the user interface module 102, the user interface module 102 may communicate which dial pattern was chosen. Once communicated, the dial pattern storage module 106 may access the chosen dial pattern from the storage system 226 and then relay that specific dial pattern to the standard dialer 300 to be used.

Figure 4A:
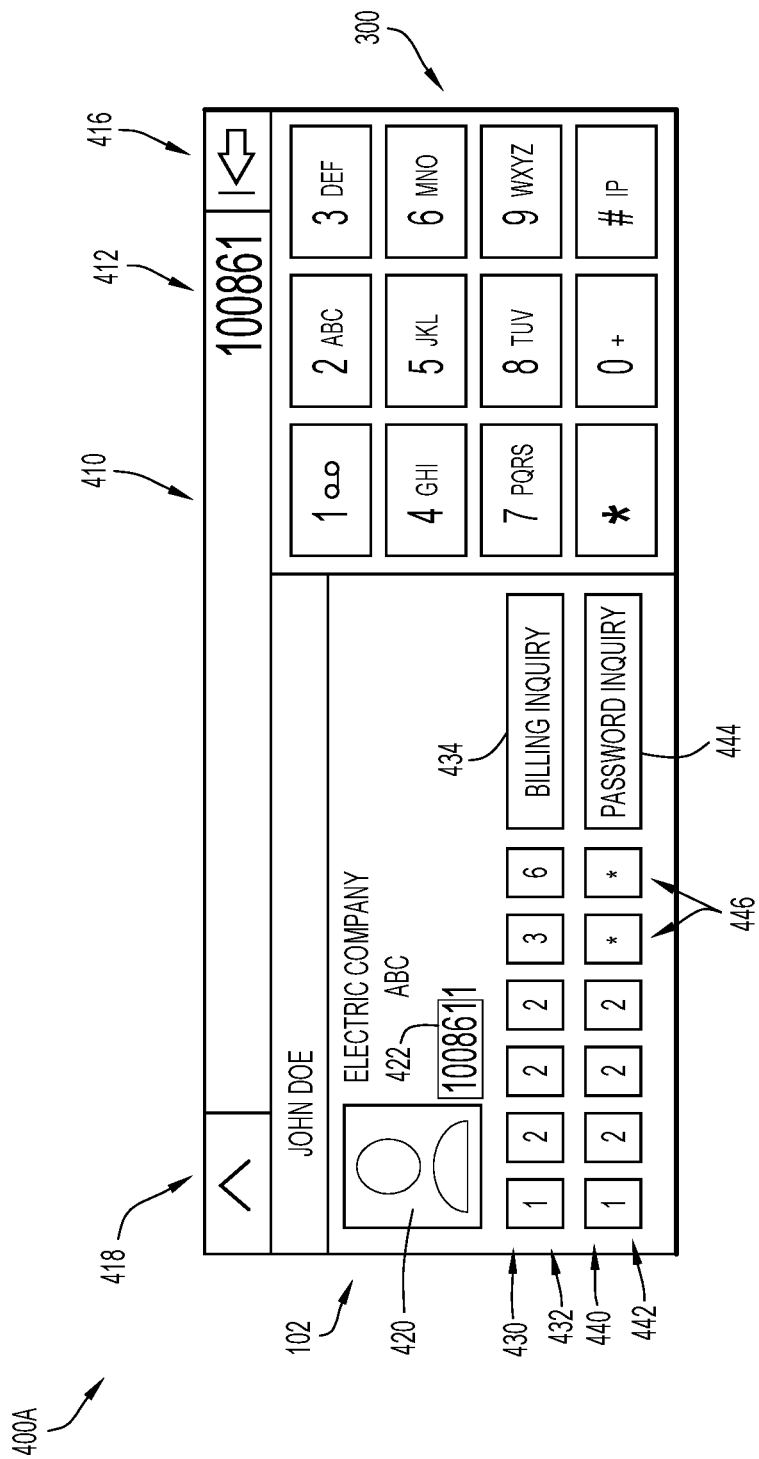
FIGS. 4A and 4B are screen shots of example user interfaces that present dial patterns to a user according to a present invention embodiment.
Figure 4B:
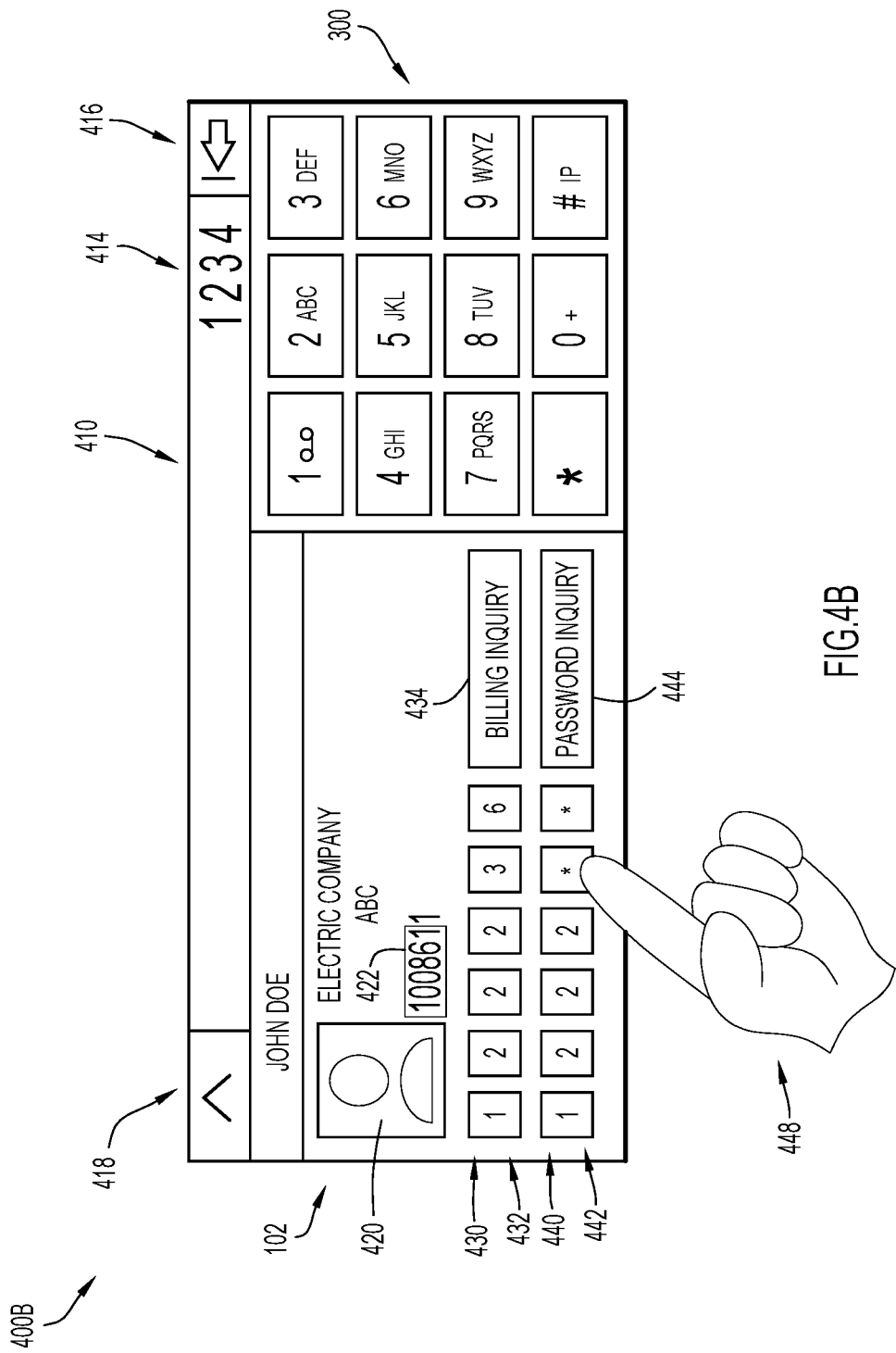

Turning to FIGS. 4A and 4B, illustrated are examples of screen shots 400A, 400B of a primary display 230 of the mobile electronic device 200 that is utilizing the modules 102, 104, 106 and the standard dialer 300. As illustrated, the standard dialer 300 is disposed on the right side of the screen shot 400A, 400B, while the user interface module 102 is displayed on the left side of the screen shots 400A, 400B. The screen shots 400A, 400B further illustrate an entry bar 410, where numbers entered via the standard dialer may be viewed. For example, illustrated in FIG. 4A, the set of numbers 412 in the entry bar 410 may represent a call number entered by the user of the mobile electronic device 200. Alternately, the set of numbers 414 in the entry bar 410 illustrated in FIG. 4B may represent numbers entered by the user after a call has been established with the call number 412. Furthermore, disposed to the right of the entry bar 410 is a first icon 416 that may serve to initiate the dialing of the call number 412 when selected after the call number 412 has been entered into the entry bar 410. Disposed to the left of the entry bar 412 is a second icon 418 that may perform one of many different operations (e.g., save a call number, bring up a saved call number, access an address book, bring up additional menu options, etc.).

As further illustrated in FIGS. 4A and 4B, the user interface module 102 includes an avatar 420. The avatar 420 may be of the user currently operating the mobile electronic device 200. In addition, adjacent the avatar 420 may be a call number representation 422, while a series of dial patterns 430, 440 are disposed below the avatar 420 and the call number representation 422. As best illustrated in FIG. 4A, once the call number 412 has been entered into the entry bar 410, the dial pattern recognition module 104 may recognize the call number 412 and instruct the user interface module 102 to present dial patterns 430, 440, which are associated with the dialed call number 412 and the user with that avatar 420. Thus, the dial patterns 430, 440 displayed by the user interface module 102 are dial patterns that the dial pattern recognition module 104 had previously recognized as reoccurring sequences when calling the call number 412. When displayed by the user interface module 102, each dial pattern 430, 440 may include a dial string, or set of numbers, and a dial pattern name. As illustrated, the first dial pattern 430 includes a dial string 432, which includes the string of "122236" for the first dial pattern 430. In addition, the first dial pattern 430 may include a name 434, which may be assigned by the user. The second dial pattern 440 includes a dial string 442, which includes the string of "1222**" and a dial pattern name 444. The second dial pattern 440 may include asterisks 446, which hide the presentation of certain types of confidential or sensitive information (e.g., passwords, social security numbers, etc.). In one example, the first dial pattern 430 may be a billing inquiry dial pattern, and may be used to navigate an automated menu presented by the call center associated with call number 412 to access the billing inquiry portion of the automated menu or a person who can service billing inquiries. The second dial pattern 440 may be a password inquiry dial pattern, which may be used to navigate an automated menu presented by the call center associated with call number 412 to remedy lost passwords. Because the second dial pattern 440 includes credential information represented by asterisks 446, when the asterisks 446 are selected 448, as illustrated in FIG. 4B, the user may then be prompted to enter the confidential information. The set of numbers 414 in the entry bar 410 of "1234" may represent the confidential information hidden by the asterisks 448.

Thus, the user interface module 102 may enable a user to select a dial pattern 430, 440 from the user interface module 102 so that the selected dial pattern is entered by the standard dialer 300 and is used to navigate the automated menus presented by the call number 412. The user interface module 102 may also enable a variety of other functions. For example, a user may be able to, through the user interface module 102, import and export dial patterns. The user interface module 102 also enables users to edit dial patterns after they have been saved. Finally, as briefly mentioned above, the user interface module 102 may also enable users encrypt confidential and sensitive information (e.g., passwords, social security numbers, credit card numbers, etc.).

Furthermore, dial patterns 430 may be entered and saved in a variety of ways. As previously explained, the dial pattern recognition module 104 may monitor and analyze all of the sequences and entries input through the standard dialer 300. In addition, if made available by the call centers, dial patterns may be downloaded from the call center web pages. Dial patterns may also be input and saved by manual entry of a user using the mobile electronic device 200 or imported from another mobile electronic device 200 or client system 100.

Figure 5:
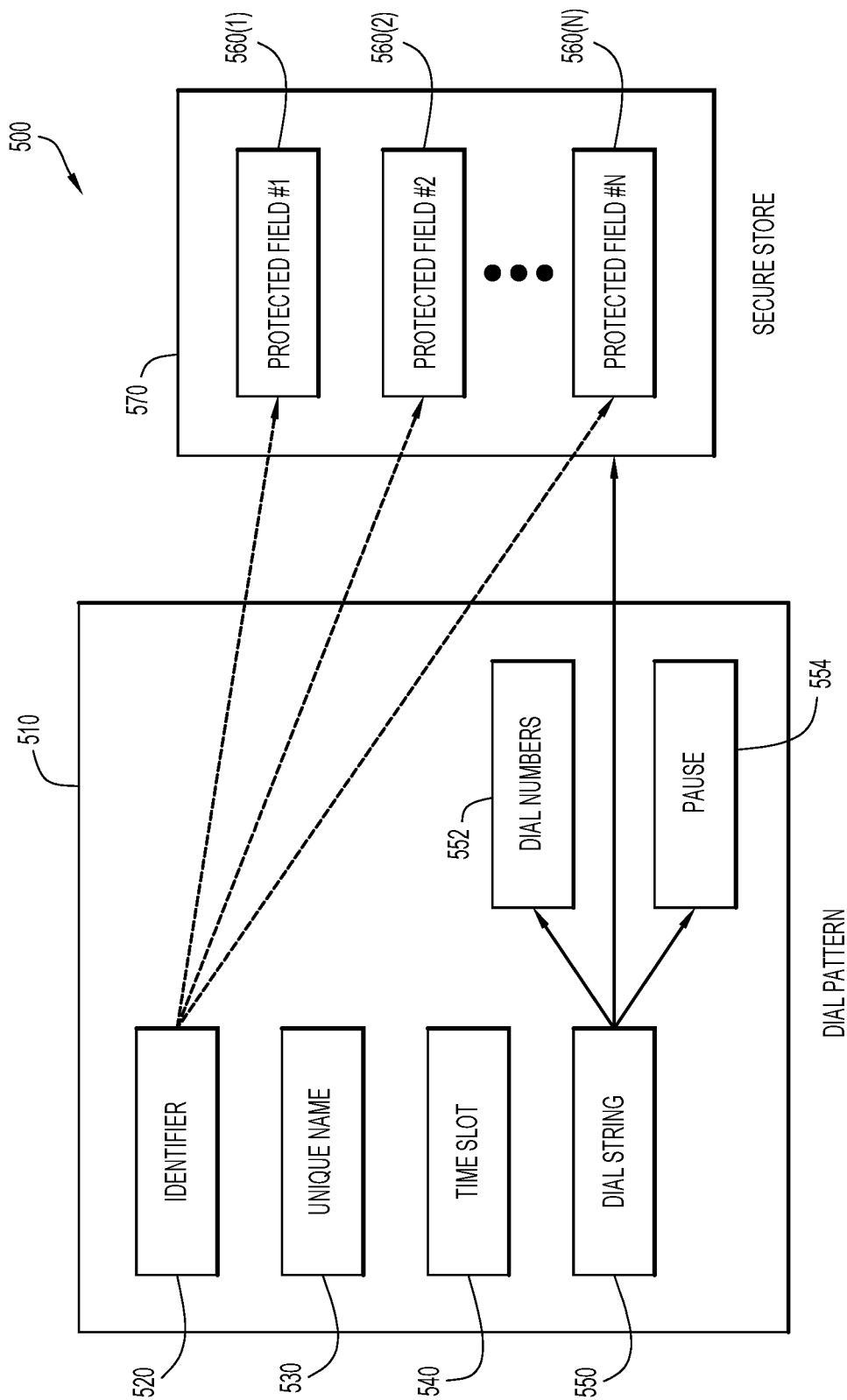
FIG. 5 is a schematic diagram illustrating the components of a dial pattern according to an embodiment of the present invention.

With reference now to FIG. 5, schematic diagram 500 depicts the various components or structure of a dial pattern. A dial pattern 510 may contain an identifier component 520, a unique name component 530, a time slot component 540, and a dial string component 550. The identifier component 520 may be unique for each saved dial pattern 510. The identifier component 520 may be used by the user interface module 102 and the dial pattern recognition module 104 to locate and access that specific dial pattern 510 from the dial pattern storage module 106. Upon determination of the dial pattern 510, the dial pattern recognition module 104 may assign the new dial pattern 510 an identifier for future use. The unique name component 530 of each dial pattern 510 represents the name presented to the user by the user interface module 102 for that dial pattern 510. For example, as illustrated in FIGS. 4A and 4B, dial pattern 430 had unique name 434, while dial pattern 440 had unique name 444. The unique name component 530 of the dial pattern 510 may enable the user to identify the situation in which the dial pattern 510 should be used (e.g., billing queries, hotel booking, etc.). The unique name component 530 may be set by the user.

The time slot component 540 indicates when the dial pattern 510 was detected and when the dial pattern 510 is to be used. Because call centers may present different automated menu messages depending on the time of day (e.g., normal business hours, after business hours, lunch, etc.) and the day of the week or year (e.g., weekdays, weekend days, holidays, etc.), different dial patterns 510 may be required for a single call center. Thus, when the dial pattern recognition module 104 initially recognizes the dial pattern 510, the dial pattern recognition module 104 may associate that dial pattern with the a specific date and time, which is represented by the time slot component 540.

The dial string component 550 may represent the specific dial string of the dial pattern 510. For example, as illustrated in FIGS. 4A and 4B, the first dial pattern 430 had a dial string of 432, which was the sequence of "122236," while the second dial pattern 440 had a dial string 442, which was the sequence of "1222." The dial string component 550 of the dial pattern 510 may include a series or mixture of numbers 552 (i.e., numbers 0-9) and pauses 554. The dial numbers include any series of numbers of a standard dialer 300. The dial numbers 552 may also include a symbol to represent sensitive and/or confidential information (e.g., an asterisk, an at sign, a pound sign, etc.). For example, as illustrated in FIGS. 4A and 4B, the dial pattern 510 included asterisks 446, which represented confidential information. When the dial string component 550 includes sensitive and/or confidential information, that portion of the dial string component 550 may be stored as a protective field 560(1)-560(N) in secure storage 570. Secure storage 570 may be encrypted to ensure security. The secure storage 570 may be a database or memory separate from that of storage system 226 illustrated in FIG. 2, or may be a subset of storage system 226. When requested by the user interface module 102 or the dial pattern recognition module 104, the dial pattern 510 may be called by a combination of the identifier component 520 and the specific protective field 560(1)-560(N) applicable to the automated menu. Thus, any one of the protective fields 560(1)-560(N) may be used in connection with the dial string 550 of a dial pattern 510**.

As previously explained, the dial string 550 may include both dial numbers 552 and pauses 554. Pauses 554 may include hard pauses and soft pauses. Hard pauses may be represented in the dial string 550 by a semicolon or a "w," while soft pauses may be represented by a comma or a "p." A hard pause may prompt the user for approval prior to dialing the additional entries of the dial string 550 that occur after the hard pause. A soft pause may require a wait of one to two seconds before dialing the entries of the dial string 550 that occur after the soft pause.

Figure 6:
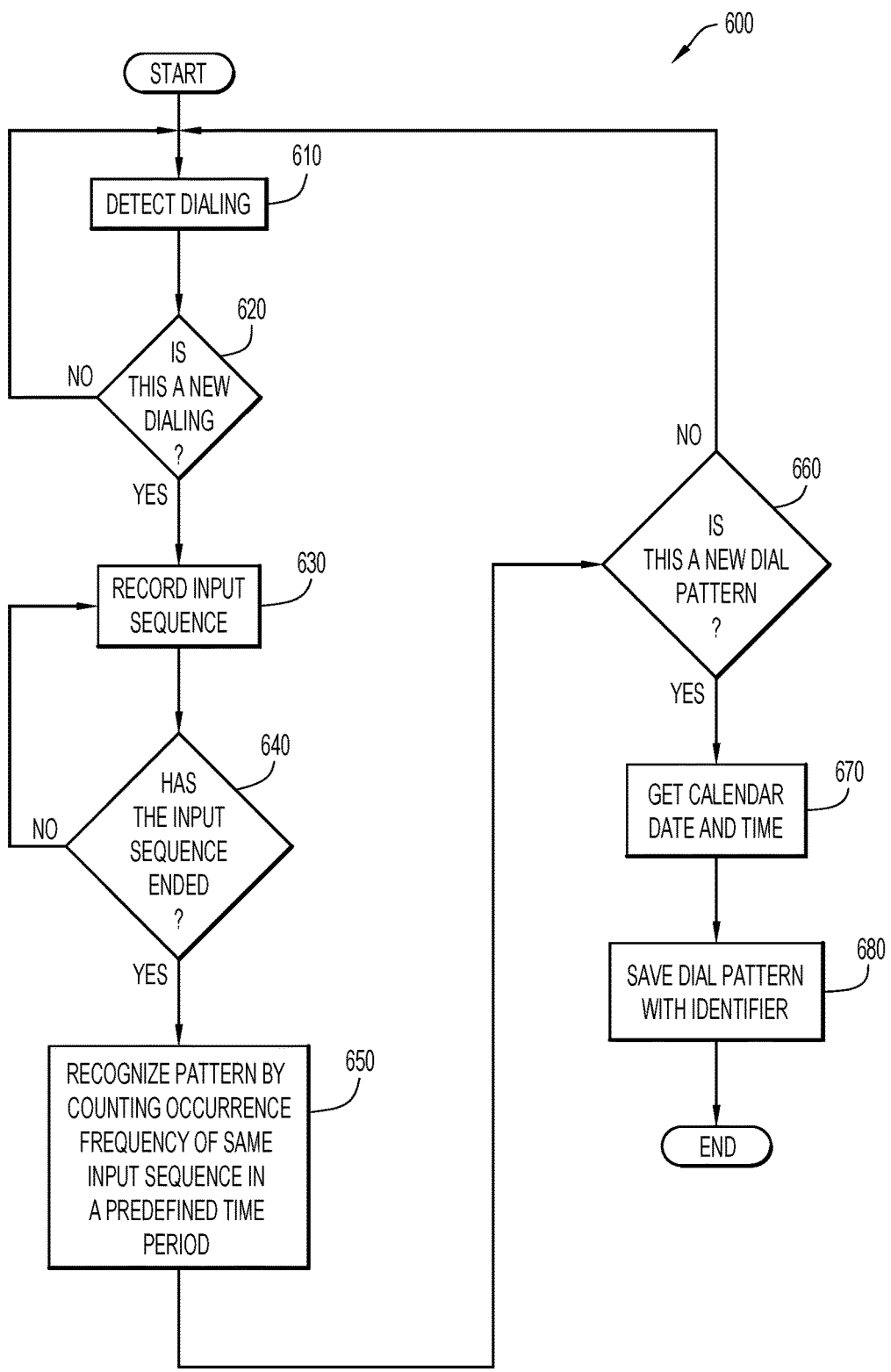
FIG. 6 is a procedural flow chart of the generation of a dial pattern according to a present invention embodiment.

With reference now to FIG. 6, procedural flowchart 600 depicts operations (e.g., of dial pattern recognition module 104) for monitoring the standard dialer 300 of the client system 100 and for recognizing when a reoccurring dial pattern 510 has been entered into the dialer 300. Initially, at step 610, the dial pattern recognition module 104 detects dialing entries or inputs through the standard dialer 300. At step 620, the dial pattern recognition module 104 determines whether the detected dialing is a new input sequence or whether the detected dialing is part of an already started sequence. If the dial pattern recognition module 104 determines that the detected dialing is part of an already started sequence (e.g., the user paused when entering in a call number), then the dial pattern recognition module 104 returns to detecting dialings being entered into the standard dialer 300. However, in the even that the dial pattern recognition module 104 determines the detected dialing is a new input sequence, then, at step 630, the dial pattern recognition module 104 begins recording the input sequence.

At step 640, the dial pattern recognition module 104 checks to see if the recorded dialing sequence has ended (i.e., has the user stopped inputting entries via the standard dialer 300). The dial pattern recognition module 104 may determine that the input sequence has ended when an input has not been received by the standard dialer 300 within a predetermined period of time. If the dial pattern recognition module 104 determines that the recorded input sequence has not ended, then the dial pattern recognition module 104 continues to record the input sequence at step 630. However, if the dial pattern recognition module 104 determines that the recorded input sequence has ended, then, at step 650, the dial pattern recognition module 104 analyzes whether the recorded input sequence is a recognized pattern. For example, the dial pattern recognition module 104 determines the occurrence frequency of the recorded input sequence within a period of time. This period of time may be set by the user or may be a predetermined period of time automatically set by the dial pattern recognition module 104.

After the dial pattern recognition module 104 determines the occurrence frequency of the recorded input sequence, the dial pattern recognition module 104, at step 660, determines whether the recorded input sequence is a new dial pattern. The dial pattern recognition module 104 may determine that the recorded input sequence is a new dial pattern based on the occurrence frequency of the recorded input sequence within a predetermined period of time. If the occurrence frequency is not above a predetermined threshold, then the dial pattern recognition module 104 returns to step 610 to detect if the user is entering a dialing sequence via the standard dialer 300. However, if the occurrence frequency is above a predetermined threshold, then, at 670, the dial pattern recognition module 104 determines the calendar date and the time of when the user began entering the dial pattern. Then, at step 680, the dial pattern recognition module 104 saves the new dial pattern with a unique identifier. The dial pattern recognition module 104 may save the dial pattern in the storage system 226 via the dial pattern storage module 106 or may store the dial pattern remotely on the server system 120 via dial pattern storage module 122.

Figure 7:
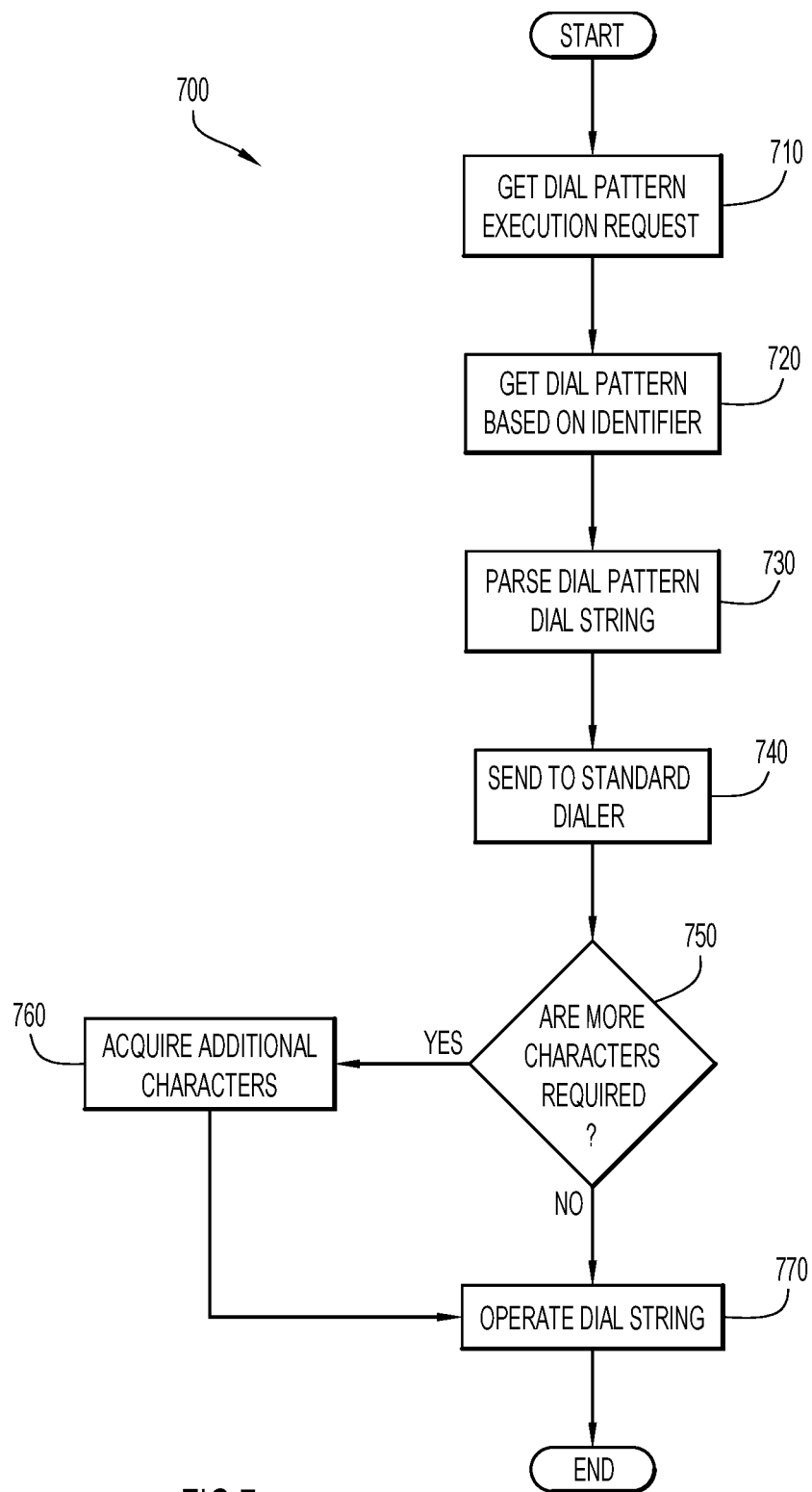
FIG. 7 is a procedural flow chart of the execution of a dial pattern according to a present invention embodiment.

With reference now to FIG. 7, procedural flowchart 700 depicts operations (e.g., of user interface module 102, dial pattern recognition module 104, and dial pattern storage module 106) for executing a specific dial pattern 510. Initially, at step 710, the user interface module 102 detects that a specific dial pattern 510 has been requested. As previously explained, the user interface module 102 may, based on the call number 412 input into the entry bar 410 via the standard dialer 300, present a series of dial patterns applicable to the call number 412. The user interface module 102 may receive a dial pattern execution request when the user selects, through the user interface module 102, one of the dial patterns displayed for the call number 412. At step 720, the specific dial pattern requested in step 710 is acquired from the dial pattern storage module 106 based on the identifier component 520. In one example embodiment, the user interface module 102 directly acquires the requested dial pattern from the dial pattern storage module 106. In another example embodiment, the user interface module 102 sends the request, including the identifier component 520, to the dial pattern recognition module 104, which then acquires the requested dial pattern from the dial pattern storage module 106.

At step 730, the user interface module 102 parses the dial string 550 of the dial pattern. Thus, the dial numbers 552 and the pauses 554, including their sequence, are extracted from the acquired dial pattern. At step 740, the user interface module 102 may then then send the dial string 550 to the standard dialer 300. At step 750, the user interface module 102 determines if any other additional characters are required by the dial string 550 of the acquired dial pattern. Additional characters may include any protected fields 560(1)-560(N). If additional character are required, then at step 760, the additional characters are acquired. For example, in one example embodiment, the user may be prompted to enter the additional characters via the standard dialer 300. In another example embodiment, a specific protective field 560(1)-560(N) may be acquired from the dial pattern storage module 106. Once the additional characters have been acquired at step 760, or if no additional characters were required at step 750, then at step 770, the standard dialer presents the dial string.

Figure 8:
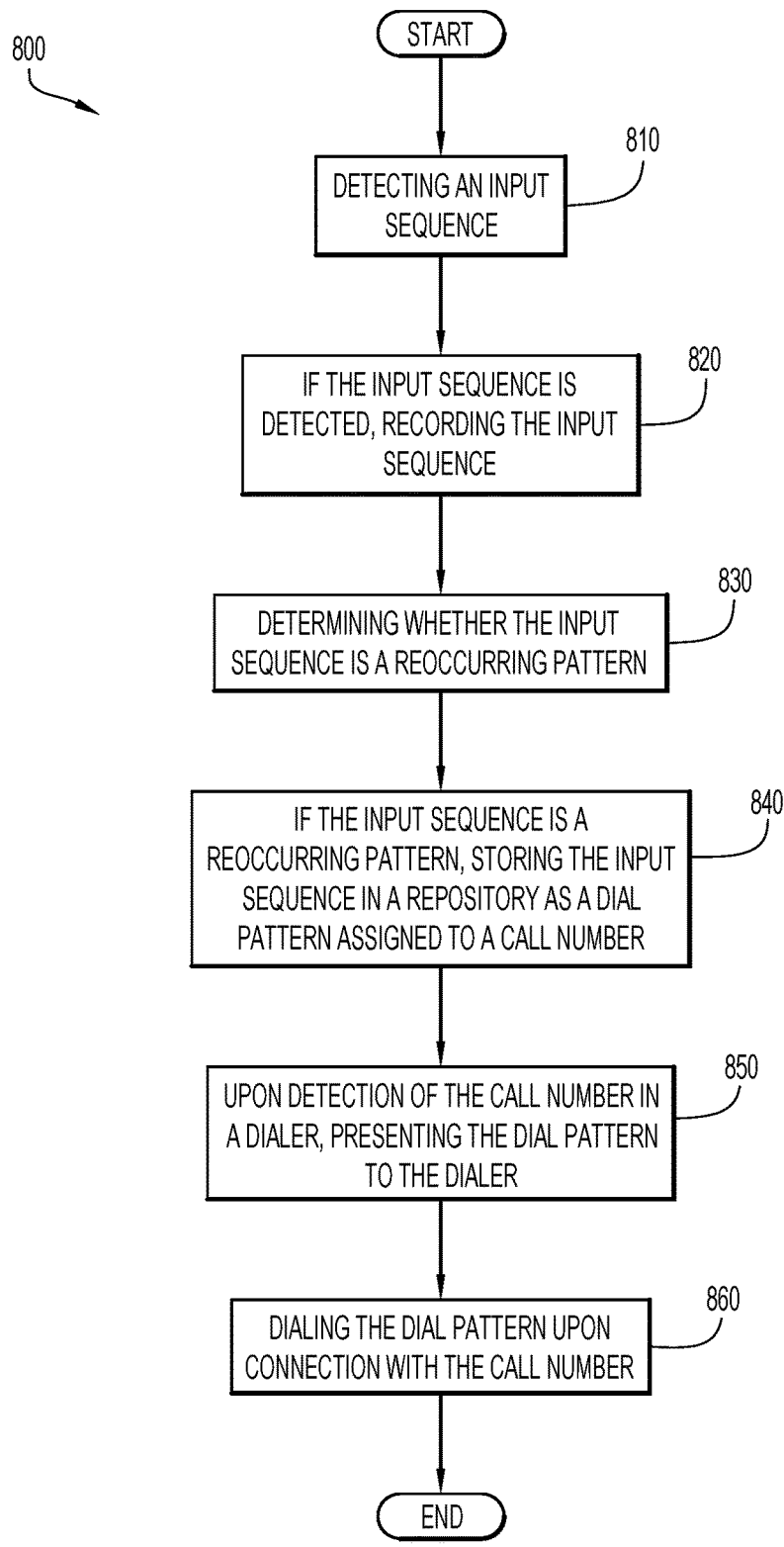
FIG. 8 is a procedural flow chart of determination of a dial pattern and the execution of the dial pattern according to a present invention embodiment.

With reference now to FIG. 8, procedural flowchart 800 depicts operations (e.g., of user interface module 102, dial pattern recognition module 104, and dial pattern storage module 106) of the client system 100 for determining when an input sequence is a dial pattern and then executing the dial pattern. At step 810, an input sequence is detected. As previously explained, the dial pattern recognition module 104 may monitor the standard dialer 300, and may be configured to detect when inputs are entered through the standard dialer 300 (e.g., a user beginning to dial a number). At step 820, if an input sequence is detected, then the input sequence is recorded. Once the dial pattern recognition module 104 has recognized that a user is inputting entries via the standard dialer 300, the dial pattern recognition module 104 records the input sequence. At step 830, the dial pattern recognition module 104 may then determine whether or not the recorded input sequence is a reoccurring pattern. As previously described, the dial pattern recognition module 104 may calculate or analyze the occurrence frequency in which the recorded input sequence has occurred within a predetermined period of time. If the frequency is higher than a set threshold, then the recorded input pattern is a reoccurring pattern, but if the frequency is below the set threshold, the recorded input sequence may not be a reoccurring pattern.

At step 840, if it is determined that the recorded input sequence is a reoccurring pattern, then the recorded input sequence is stored in a repository as a dial pattern that is assigned to a call number. As mentioned above, the dial pattern recognition module 104 is in communication with the user interface module 102, the dial pattern storage module 106, and the standard dialer 300. Thus, when the dial pattern recognition module 104 determines that the recorded input sequence is a reoccurring pattern, the dial pattern recognition module 104 also determines the call number with which to associate the recorded input sequence. The dial pattern recognition module 104 also sends the recorded input sequence to the dial pattern storage module 106 to store the recorded input sequence as a dial pattern in a repository. The repository may be local to the client system 100 (e.g., storage system 226) or may be located on a server system 120.

At step 850, the dial pattern may be presented to the dialer when the call number associated with the dial pattern is detected within the dialer. The user interface module 102 or the dial pattern recognition module 104 may detect that a call number has been dialed into the standard dialer 300, where at least one dial pattern is associated with the dialed call number. The user interface module 102 acquires the dial patterns associated with the dialed call number and may present them to the user of the client system 100. Thus, the user of the client system may choose which dial pattern to use for an established call depending on how the user would like to navigate the automated menus that are presented during the established call.

At step 860, the dial pattern is dialed by the user interface module 102 and the standard dialer once a connection is established with the dialed call number. As previously explained, call centers typically provide automated menus when a connection is established between the call center and an inbound call. The user making the inbound call is often required to navigate through the automated menu presented by the call center through the use of dialing numbers from the standard dialer 300. The user interface module 102 may relay the dial string of the dial pattern chosen by the user once a call is established to navigate through the automated menu. Thus, the various digits and pauses of the dial string of the chosen dial pattern are presented in response to the automated menu from the call center, and are used to automatically navigate through the automated menu to acquire a result desired by the user (e.g., billing inquires, book hotels, speak to an operator, etc.).

The techniques provided herein have a number of advantages. As one example, the techniques enable a user of a mobile electronic device to efficiently navigate through automated menus presented by call centers. By providing the user with appropriate dial patterns for specific automated menus, the amount of time a user is required to repeatedly listen to the automated message is reduced. In addition, the techniques also reduce the amount of time taken to acquire a resolution to the reason the user called the call center. In other words, the techniques provide a system that enables a user of a mobile electronic device to resolve the issue for which they are calling (e.g., billing inquiries, booking hotels, booking flights, etc.) because the dial patterns presented by the system may more quickly navigate through the automated menus.

Moreover, the techniques provided herein provide a system that automatically learns the dial patterns required to navigate through automated menu by monitoring a user's behavior in relation to the automated message. This eliminates the need for user's to input their own dial patterns. The automatic system is capable of updating dial patterns based on the user's behavior and/or changes to the automated menus of a specific call center. Put generally, the techniques provided herein resolve a technical problem that is necessarily rooted in computer technology and, in particular, mobile electronic device dialing systems.

It will be appreciated that the embodiments described above and illustrated in the drawings represent only a few of the many ways of implementing embodiments for automatically recognizing and saving a reoccurring dial pattern and utilizing a saved dial pattern to navigate through an automated menu message.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, user interface module 102, dial pattern recognition module 104, dial pattern storage module 106, etc.). These systems may include any types of monitors and input devices (e.g., keyboard, mouse, voice recognition, etc.) to enter and/or view information.

It is to be understood that the software (e.g., user interface module 102, dial pattern recognition module 104, dial pattern storage module 106, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., user interface module 102, dial pattern recognition module 104, and dial pattern storage module 106) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., dial patterns, protected fields, call numbers, user identities, etc.). The database system may be implemented by any number of any conventional or other databases, data stores or storage structures (e.g., files, databases, data structures, data or other repositories, etc.) to store information (e.g., dial patterns, protected fields, call numbers, user identities, etc.). The database system may be included within or coupled to the server and/or client systems. The database systems and/or storage structures may be remote from or local to the computer or other processing systems, and may store any desired data (e.g., dial patterns, protected fields, call numbers, user identities, etc.).

The present invention embodiments may employ any number of any type of user interface (e.g., Graphical User Interface (GUI), command-line, prompt, etc.) for obtaining or providing information (e.g., a indication of a document, expiration, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of recognizing and utilizing dial patterns of a mobile device comprising:
    detecting an input sequence provided to the mobile device after placing a call for requesting an activity from among a menu of activities;
    storing the input sequence in a repository as a dial pattern assigned to a call number in response to the input sequence being a reoccurring pattern;
    in response to detection of the call number in a dialer of the mobile device, retrieving and dialing the assigned dial pattern to request the activity upon establishing a connection based on the call number.

2. The computer-implemented method of claim 1, wherein the call number is a number of a call center with an automated menu message.

3. The computer-implemented method of claim 1, wherein the repository is stored locally within the mobile device.

4. The computer-implemented method of claim 1, wherein the dial pattern comprises:
    a series of numbers and pauses configured to be used by the dialer to navigate an automated menu message of a call center.

5. The computer-implemented method of claim 1, wherein the dial pattern includes at least one protected field of numbers that is encrypted.

6. The computer-implemented method of claim 5, wherein when the dial pattern includes at least one protected field of numbers, the at least one protected field of numbers is stored in a secure repository disposed locally on the mobile device.

7. The computer-implemented method of claim 1, further comprising:
    when the input sequence is not detected, downloading the dial pattern from a call center.

8. A system for recognizing and utilizing dial patterns of a mobile device comprising:
    a processor configured to:
        detect an input sequence provided to the mobile device after placing a call for requesting an activity from among a menu of activities;
        store the input sequence in a repository as a dial pattern assigned to a call number in response to the input sequence being a reoccurring pattern;
        in response to detection of the call number in a dialer of the mobile device, retrieve and dial the assigned dial pattern to request the activity upon establishing a connection based on the call number.

9. The system of claim 8, wherein the call number is a number of a call center with an automated menu message.

10. The system of claim 8, wherein the repository is stored locally within the mobile device.

11. The system of claim 8, wherein the dial pattern comprises:
    a series of numbers and pauses configured to be used by the dialer to navigate an automated menu message of a call center.

12. The system of claim 8, wherein the dial pattern includes at least one protected field of numbers that is encrypted.

13. The system of claim 12, wherein when the dial pattern includes at least one protected field of numbers, the at least one protected field of numbers is stored in a secure repository disposed locally on the mobile device.

14. The system of claim 8, wherein the processor is further configured to:
    when the input sequence is not detected, download the dial pattern from a call center.

15. A program product apparatus for recognizing and utilizing dial patterns, the program product apparatus comprising a computer readable storage medium having program instructions embodied therewith, the program instructions executable by a processor to cause the processor to:
    detect an input sequence provided to a mobile device after placing a call for requesting an activity from among a menu of activities;
    store the input sequence in a repository as a dial pattern assigned to a call number in response to the input sequence being a reoccurring pattern;
    in response to detection of the call number in a dialer of the mobile device, retrieve and dial the assigned dial pattern to request the activity upon establishing a connection based on the call number.

16. The program product apparatus of claim 15, wherein the call number is a number of a call center with an automated menu message.

17. The program product apparatus of claim 15, wherein the repository is stored locally within the mobile device.

18. The program product apparatus of claim 15, wherein the dial pattern comprises:
    a series of numbers and pauses configured to be used by the dialer to navigate an automated menu message of a call center.

19. The program product apparatus of claim 15, wherein the dial pattern includes at least one protected field of numbers that is encrypted.

20. The program product apparatus of claim 19, wherein when the dial pattern includes at least one protected field of numbers, the at least one protected field of numbers is stored in a secure repository disposed locally on the mobile device.

21. The program product apparatus of claim 15, wherein the program instructions further cause the processor to:
    when the input sequence is not detected, download the dial pattern from a call center.

* * * * *